United States Patent Office 3,524,002
Patented Aug. 11, 1970

3,524,002
ARYLOXYALKANOIC ACID AND SALTS THEREOF
Gerhard Baschang, Bettingen, and Charles Morel, Arlesheim, Switzerland, assignors to Geigy Chemical Corporation, New York, N.Y., a corporation of New York
No Drawing. Filed Oct. 2, 1968, Ser. No. 764,602
Claims priority, application Switzerland, Oct. 17, 1967,
14,505/67
Int. Cl. C11c 3/00
U.S. Cl. 424—318           4 Claims

ABSTRACT OF THE DISCLOSURE 2-(4-biphenylyloxy)-dodecanoic acid and salts thereof with a base have hypolipemic activity. Pharmaceutical compositions comprising said compounds and methods of treating hyperlipemic conditions are provided.

DETAILED DISCLOSURE

The present invention concerns an aryloxyalkanoic acid and salts thereof having valuable pharmacological properties, pharmaceutical preparations containing these compounds and the use thereof.

The 2-(4-biphenylyloxy)-dodecanoic acid of Formula I,

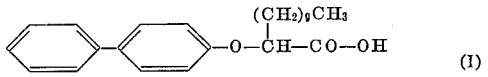

and salts thereof with bases have not been described hitherto. It has now been found that this acid and their salts possess valuable pharmacological properties. In particular, they exhibit hypolipemic activity which can be shown for example by the lowering of cholesterol and triglyceride levels in serum and liver of male rats on repeated oral administration.

The 2-(4-biphenylyloxy)-dodecanoic acid and salts thereof are further characterised by a long persistence in the plasma and low toxicity. They are suitable for oral and rectal administration to warm-blooded animals for the treatment of hyperlipemic conditions, such as for example hypercholesterinemia.

The 2-(4-biphenylyloxy)-dodecanoic acid and salts thereof are produced by hydrolysing a functional derivative of the acid, if desired liberating the acid from an obtained salt and/or converting an obtained acid into a salt, or, by double reaction, converting directly the initially obtained salt into another salt with an inorganic or organic base.

Suitable functional derivatives of 2-(4-biphenylyloxy)-dodecanoic acid are for example esters thereof of Formula II

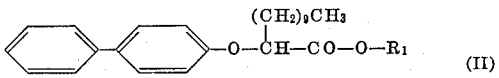

wherein $R_1$ denotes a hydrocarbon group, in particular a lower alkyl group or the cyclohexyl-, phenyl- or benzyl group.

Also applicable are for example nitriles, amides and lower imidoalkyl esters. Hydrolysis is carried out for example by heating in an alkanolic or aqueous-alkanolic alkali-hydroxide solution. From the alkali salt solutions of 2-(4-biphenylyloxy)-dodecanoic acid thus initially obtained, the corresponding pure alkali salt can be prepared either directly by concentrating or evaporating and recrystallising, or by firstly liberating the acid and then purifying, e.g. by recrystallisation, and if desired reconverting into a salt with a suitable inorganic or organic base. Functional derivatives of 2 - (4 - biphenylyloxy)-dodecanoic acid can also be converted into the free acid in an acid medium, e.g. by heating in a solution of a 60–70% sulphuric acid or in alkanolic-aqueous hydrochloric acid.

The esters of Formula II, and also the corresponding nitriles, amides and lower imidoalkyl esters, are new compounds. To produce esters of Formula II, an alkali metal salt of p-phenylphenol is reacted with a reactive ester with respect to the 2-hydroxy group of a 2-hydroxydodecanoic acid ester of Formula III,

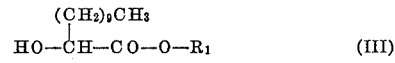

wherein $R_1$ has the meanings given under Formula II, in a suitable solvent, such as ethanol at its boiling temperature or in dimethyl formamide at 40–130, preferably at 60–90°. The required alkali metal salt of p-phenylphenol can be used as such, or can be produced prior to the reaction in situ, in ethanol for example by means of the corresponding alkali metal ethylate, or in dimethyl formamide using a suitable alkali metal hydride, in particular sodium or lithium hydride.

As reactive esters with respect to the 2-hydroxy group of compounds of Formula III, halogenides, e.g. esters of 2-halogen dodecanoic acids, and also derivatives of arensulphonic acids and alkane sulphonic acids, such as, e.g. 2-(4-toluene-sulphonyloxy)- and 2-(methane - sulphonyloxy)-dodecanoic acid esters, are for example suitable. Some of these compounds, e.g. 2-bromododecanoic acid ethyl ester are known, others can be obtained, analogously to the known compounds and/or corresponding derivatives, from lower alkanoic acids. Analogously to the reactive esters of compounds of Formula III, reactive esters of 2-hydroxy dodecanoic acid nitrile, e.g. the known 2-bromododecanoic acid nitrile, can also be reacted with alkali metal salts of p-phenylphenol. The obtained nitrile of the 2-(4-biphenylyloxy)-dodecanoic acid is either hydrolysed directly to form the acid, or if desired converted in a manner as known per se into the corresponding amide or into a lower imidoalkyl ester of the hydrohalogenide thereof, i.e. into further starting substances suitable for hydrolysis to obtain 2 - (4 - biphenylyloxy)-dodecanoic acid or salts thereof.

Furthermore, the nitrile and the amide of 2 - (4 - biphenylyloxy) - dodecanoic acid can also be produced starting from lower alkyl esters of (4 - biphenylyloxy)-n-decyl - cyano - acetic acid, the production of which is given further below. Thus, by partial hydrolysis of a substituted cyano acetic acid alkyl ester with an approximately equimolar amount of an aqueous or alkanolic alkali metal hydroxide solution followed by acidification and then decarboxylation, the desired nitrile is obtained. By boiling substituted alkyl esters of cyano-acetic acid with an excess of alkanolic alkali hydroxide solution and then acidifying, the monoamide of the substituted malonic acid is obtained, possibly mixed with the free, substituted acid and the desired ultimate end product, the 2-(4-biphenylyloxy)-dodecanoic acid of Formula I. By decarboxylating, the amide of 2-(4-biphenylyloxy)-dodecanoic acid or a mixture of the aforesaid with the free acid is obtained, which free acid can be converted exactly as the pure amide into the same final product.

According to a second process, the 2-(4-biphenylyloxy)-dodecanoic acid and its salts can be obtained by heating a functional derivative of (4 - biphenylyloxy)-n-decyl-malonic acid, especially a di-lower alkyl ester thereof, as well as a lower alkyl-nitrile ester or the dinitrile thereof, with an inorganic or organic base until an equimolar amount of carbon dioxide is split off, optionally, liberating the acid from the salt of the 2-(4-biphenylyloxy)-dodecanoic acid obtained and then if desired converting the salt or the free acid into another salt with an inorganic or organic base. For example, the dialkyl ester of (4 - biphenylyloxy) - n - decyl malonic acid is refluxed with excess alkanolic alkali hydroxide solution, e.g. with methanolic potassium hydroxide solution, for several hours. The conversion of the alkyl-nitrile ester and the dinitrile are analogous, but the conditions are more strenuous, e.g. longer reaction times and/or higher temperatures in a closed container.

The di-lower alkyl esters, the alkyl-nitrile esters and the dinitrile of (4 - biphenylyloxy) - n - decyl-malonic acid, as well as the acid itself, are new compounds. They can be produced, for example, analogously to the esters of Formula III by reacting a dialkyl ester of bromo- or chloro-n-decyl malonic acid or an alkyl ester of bromo- or chloro - n - decyl - cyanoacetic acid or bromo-n-decyl-malonitrile with an alkali metal salt of p-phenyl phenol, e.g. in boiling abs. ethanol. The bromo- and chloro-compounds needed as starting materials are obtained, for example, by halogenating in an analogous manner to corresponding, known compounds having a lower alkyl group, e.g. diethyl bromo-n-butyl malonate [J. Am. Chem. Soc. 44, 1578–1581 (1922)].

According to a third process, the 2 - (4 - biphenylyloxy)-dodecanoic acid and salts thereof are obtained by heating (4 - biphenylyloxy) - n - decyl malonic acid or a salt thereof with an inorganic or organic base, in particular a monoalkali metal salt thereof, until the equivalent amount of carbon dioxide is split off, and converting the acid obtained, using the free dicarboxylic acid, if desired into a salt with an inorganic or organic base. The stated dicarboxylic acid is for example heated to temperatures between 130–200°, until the evolution of carbon dioxide has finished. The 2 - (4 - biphenylyloxy) - malonic acid is, for example, obtained by hydrolysis of its corresponding lower dialkyl esters of a corresponding nitrile-alkyl esters, i.e. (4 - biphenylyloxy) - n - decyl malonic acid dialkyl esters or (4 - biphenylyloxy) - n - decyl-cyanoacetic acid alkyl esters, with alkanolic or aqueous-alkanolic potassium hydroxide solution or sodium hydroxide solution at slightly elevated temperature and subsequent acidification. According to one form of application of the process according to the invention, a functional derivative of the stated dicarboxylic acid, for example one of the lower dialkyl esters or nitrile alkyl esters, also for example dinitrile, is heated with a hydrous mineral acid, whereby the dicarboxylic acid occurring as a result of hydrolysis, is decarboxylated under the reaction conditions directly to form 2 - (4 - biphenylyloxy) - dodecanoic acid. As hydrous mineral acid can be used for example 60–70% sulphuric acid, or, in a closed vessel, concentrated hydrochloric acid, to which can be added an organic solvent of suitable boiling-point, which is water-soluble or which can be mixed with water, for example acetic acid.

A further process for producing 2-(4-biphenylyloxy)-dodecanoic acid and salts thereof comprises reacting an alkali metal salt of p-phenylphenol with a salt of a reactive ester with respect to the 2-hydroxy group of the 2-hydroxy-dodecanoic acid, liberating if desired the acid from the obtained salt and/or if desired converting the acid into a salt, or by double reaction, the initially obtained salt directly into another salt with an inorganic or organic base. The reaction is performed preferably in a solvent or diluent, e.g. in a lower, optionally hydrous alkanol, such as ethanol or butanol, or in dimethyl formamide at a temperature of about 80° up to the boiling temperature of the reaction medium. Formation of the salts required as direct reaction constituents, from the free p-phenylphenol or from the free acid, occurs preferably in situ, for example as a result of adding an alkali metal alcoholate, an alkali hydroxide or alkali metal hydride, depending on whether a hydrous alkanol, an anhydrous alkanol or dimethyl formamide is used as the reaction medium. Reactive esters of 2-hydroxy-dodecanoic acid are, e.g. halogenides, arensulphonic acid esters and alkane sulphonic acid esters, known examples being 2-bromo-dodecanoic acid and 2-chlorododecanoic acid.

If desired, the salts of 2-(4-biphenylyloxy)-dodecanoic acid to be used as pharmaceutically active substances are in general those, the cation of which exhibits, with regard to the dosages in question, no biological inherent effect, or else a desired inherent effect, and the solubility of which in the stomach and intestinal contents ensures an adequate absorbtion. Salts which do not fulfil these requirements, but which for example easily crystallize, can optionally be of use in the course of synthesis and purification of the acid or of other salts. Suitable salts of the 2-(4-biphenylyloxy)-dodecanoic acid produced according to the invention are in particular the alkali metal salts, such as the potassium, lithium and, particularly, sodium salt, also the alkaline earth metal salts and earth metal salts, such as calcium, magnesium or aluminium salt, and the ammonium salt, salts with primary, secondary or tertiary aliphatic or isocyclic bases and also secondary or tertiary heterocyclic bases, such as for example ethylamine, triethylamine, 2-aminoethanol, 2,2'-iminodiethanol, 2-dimethylamino-ethanol, 2-diethylamino-ethanol, ethylene diamine, benzyl amine, p-aminobenzoic acid diethylaminoethyl ester, pyrrolidine, piperidine, morpholine, 1-ethyl-piperidine, 2-piperidino-ethanol, and salts with basic ion-exchangers. The salts are produced in conventional manner by combining acid and base in suitable solvents, such as, e.g. methanol, and optionally filtering off precipitated salts or evaporating the salt solutions. In place of free bases, corresponding, soluble carbonates, e.g. sodium or potassium carbonate or bicarbonate can also be used. Moreover salts, which are relatively difficult to dissolve in the applied solvent, can also be produced by double reaction of another salt of the acid with a suitable salt of the base.

The hypolipemic activity of the compound of the invention is illustratively demonstrated in rats according to the following method:

To a group of ten male rates of the Wistar strain each weighing between 90 and 110 g. and fed with a standardised diet and water ad libitum is administered orally by means of an esophageal sound a 2.5% suspension of 2-(4-biphenylyloxy)-dodecanoic acid in 1% gum arabic. The active compound is administered this way in a daily dosage of 2× 50 mg./kg. on nine consecutive days. The animals are abstained from food the last sixteen hours of the experiment and then sacrificed. Extraction of serum and liver lipids is carried out according to Folch et al., J. Biol. Chem., 226, 497 (1957). Triglyceride and cholesterol contents are determined according to the methods of Carlson, J. Arterioscler. Res., vol. 3,334 (1963) and Richterich and Lauber, Klin. Wschr., 40, 1252 (1962), respectively.

The lipid content of this group of rats is compared with a control group. Thus it is shown that 2-(4-biphenylyloxy)-dodecanoic acid lowers the cholesterol and triglyceride levels of serum and liver to a very significant extent.

The toxicity of the compound of the invention on oral administration as demonstrated in rates and mice is of very low order.

The 2-(4-biphenylyloxy)-dodecanoic acid and salts thereof are, as already mentioned, administered orally or rectally. Daily dosages vary between 50 and 500 mg. for adult patients. Suitable dosage units, such as dragees (sugar-coated tablets), tablets and suppositories preferably contain as active substance 10–250 mg., e.g. 50 or 100 mg. of the acid or of a salt thereof with a pharmaceutically acceptable inorganic or organic base.

The content of active substance in dosage units for peroral administration is preferably between 10 and 90%. They are produced by combining the active substance with, e.g. solid pulverulent carriers, such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragee cores. These are coated for example with concentrated sugar solutions, which can also contain, e.g. gum arabic, talcum and/or titanium dioxide, or with a lacquer dissolved in easily volatile organic solvents or mixtures of solvents. Dyestuffs can be added to these coatings, e.g. to indicate the varying content of active substance. Other suitable dosage units for oral administration are hard gelatine capsules and also soft closed capsules made of gelatine and a softener such as glycerine. The former preferably contain the active substance as a granulate in admixture with lubricants such as talcum or magnesium stearate, and optionally stabilisers, such as sodiummetabisulphite ($Na_2S_2O_5$) or ascorbic acid. In soft capsules, the active substance is preferably dissolved or suspended in suitable liquids, such as liquid polyethylene glycols, whereby stabilisers can be added.

Applicable as dosage units for rectal administration are for example suppositories consisting of a combination of an active substance with a suppository base substance having a base of natural or synthetic triglycerides (e.g. cocoa butter), polyethylene glycols or suitable higher fatty alcohols, and gelatine rectal capsules, which contain a combination of the active substance with polyethylene glycols.

The following prescriptions explain in more detail the production of tablets and dragees:

(a) 1000 g. of 2-(4-biphenylyloxy)-dodecanoic acid are mixed with 550 g. of lactose and 292 g. of potato starch. The mixture is moistened with an alcoholic solution of 8 g. of gelatine and granulated through a sieve. After drying, 60 g. of potato starch, 60 g. of talcum and 10 g. of magnesium stearate and 20 g. of highly dispersed silicon dioxide are mixed in and from the mixture are pressed out 10,000 tablets each having a weight of 200 mg. and a content of active substance of 100 mg. The tablets can, if desired, be provided with grooves for more accurate adjustment of the dosage.

(b) 100 g. of 2-(4-biphenylyloxy)-dodecanoic acid are well mixed with 16 g. of maize starch and 6 g. of highly dispersed silicon dioxide. The mixture is moistened with a solution of 2 g. of stearic acid, 6 g. of ethyl cellulose and 6 g. of stearine in ca. 70 ml. of isopropyl alcohol and granulated through a sieve II (Ph. Helv. V). The granulate is dried for ca. 14 hours and then put through sieve III–IIIa. The granule is then mixed with 16 g. of maize starch, 16 g. of talcum and 2 g. of magnesium stearate and 1000 dragee cores are pressed out from the mixture. These are coated with a concentrated syrup of 2 g. of shellac, 7.5 g. of gum arabic, 0.15 g. of dyestuff, 2 g. of highly dispersed silicon dioxide, 25 g. of talcum and 53.35 g. of sugar and then dried. The obtained dragees each weigh 260 mg. and each contain 100 mg. of active substance.

The following prescription further illustrates the production of suppositories.

A suppository composition is prepared from 10.0 g. of 2-(4-biphenylyloxy)-dodecanoic acid and 163.5 g. of adeps solidus (solid fat) and 100 suppositories each having 100 mg. of active ingredient are poured therefrom.

The following examples further illustrate the production of 2-(4-biphenylyloxy)-dodecanoic acid and salts thereof but do not in any way restrict the scope of the invention. Temperatures are given in degrees centigrade.

EXAMPLE 1

8 g. of (0.01 mol) of 2-(4-biphenylyoxy)-dodecanoic acid methyl ester are refluxed with 1.5 g. (0.027 mol) of potassium hydroxide in 50 ml. of ethanol for two hours. The solution is then evaporated and mixed with water. If a clear solution is not obtained, the undissolved substance is removed by washing with ether. The clear alkaline solution is then acidified with 2 N hydrochloric acid. The 2-(4-biphenylyloxy)-dodecanoic acid is filtered by suction and purified by recrystallizing from methanol/water, M.P. 110–112°.

In analogous manner the 2-(4-biphenylyloxy)-dodecanoic acid ethyl ester is hydrolysed.

(a) 14.5 g. (0.085 mol) of p-phenylphenol are dissolved at room temperature in 100 ml. of dimethyl formamide. 3.1 g. (0.065 mol) of sodium hydride dispersion (50% dispersion in mineral oil) are added with stirring thereto. After completion of the conversion to the sodium salt, 16.7 g. (0.057 mol) of 2-bromo-dodecanoic acid methyl ester are added and the mixture is then heated for 15 hours while stirring at a temperature of 80°. The dimethyl formamide is evaporated in vacuo (1 torr) and the residue dissolved in ether and the ethereal solution washed with water and with 0.5 N sodium hydroxide solution until the aqueous phase is free of any p-phenylphenol. The ethereal solution is washed with water until a neutral reaction is obtained. The resulting ethereal solution is dried over sodium sulphate, filtered and concentrated. The remaining 2-(4-biphenylyloxy)-dodecanoic acid methyl ester crystallises and melts after recrystallisation from methanol at 59–60°.

(b) In an analogous mnaner to Example 1(a), the 2-(4-biphenylyloxy)-dodecanoic acid ethyl ester is obtained by using the sodium salt of p-phenylphenol and 2-bromo-dodecanoic acid ethyl ester in anyhdrous ethanol. The 2-(4-biphenylyloxy)-dodecanoic acid ethyl ester precipitates as an oil and is used without purification for hydrolysis.

EXAMPLE 2

36.85 g. (0.1 mol) of 2-(4-biphenylyloxy)-dodecanoic acid are dissolved in methanol. To the obtained solution are added 3.8 g. (0.095 mol) of carbonate-free sodium hydroxide and the solution is evaporated until dry. The residue is separated from the starting material by extraction with ether, whereupon the pure sodium salt remains, which does not melt below 350°.

EXAMPLE 3

8.5 g (0..05 mol) of p-phenylphenol are added to a solution of 2.3 g. (0.1 mol) of sodium in 120 ml. of anhydrous ethanol. After complete dissolution of the added substance, the solution is cooled to 0–5° and 13.96 g. (0.05 mol) of 2-bromo-dodecanoic acid is added at that temperature. The reaction mixture is heated to the boil, the alcohol evaporated, the residue dissolved in water and the solution acidified with 2 N hydrochloric acid. After recrystallisation from approximately 250 ml. of 65% aqueous ethanol, the resulting 2-(4-biphenylyloxy)-dodecanoic acid (colourless crystals) melts at 110–112°.

What we claim is:

1. 2-(4-biphenylyloxy)-dodecanoic acid.
2. A pharmaceutically acceptable salt of the compound according to claim 1 with a base.
3. A pharmaceutical composition comprising a compound according to claim 1 or a pharmaceutically acceptable salt thereof with a base and an inert pharmaceutical carrier.

4. A method of treating hypolipemic conditions in warm-blooded animals comprising administering to said animals a hypolipemically effective amount of a compound according to claim 1 or a pharmaceutically acceptable salt thereof with a base.

References Cited

UNITED STATES PATENTS 2,198,293   4/1940   Reiff et al. _____ 260—413

OTHER REFERENCES

Chem. Abstracts, Vol. 54, Jan.-Feb., 1960, 3287c.

LEWIS GOTTS, Primary Examiner

E. G. LOVE, Assistant Examiner

U.S. Cl. X.R.

260—404, 410, 410.5, 410.9, 413, 453, 465, 465.8, 473, 485; 424—248, 267, 274, 316